United States Patent
Gao et al.

(10) Patent No.: US 12,450,444 B1
(45) Date of Patent: Oct. 21, 2025

(54) LARGE LANGUAGE MODEL PERFORMANCE EVALUATION AND MODIFICATION

(71) Applicant: INTUIT INC., Mountain View, CA (US)

(72) Inventors: Xiang Gao, Mountain View, CA (US); Avinash Baidya, Mountain View, CA (US); Kamalika Das, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/195,374

(22) Filed: Apr. 30, 2025

(51) Int. Cl.
*G06F 40/35* (2020.01)
*G06F 11/3668* (2025.01)

(52) U.S. Cl.
CPC .......... *G06F 40/35* (2020.01); *G06F 11/3696* (2013.01)

(58) Field of Classification Search
CPC ............................ G06F 11/3696; G06F 40/35
See application file for complete search history.

(56) References Cited

U.S. PATENT DOCUMENTS

| | | | |
|---|---|---|---|
| 12,254,279 B1* | 3/2025 | Cohen | G06F 40/35 |
| 2020/0135195 A1* | 4/2020 | Ishikawa | G06Q 50/06 |
| 2023/0108863 A1* | 4/2023 | Gunasekara | G06N 3/0442 |
| | | | 706/15 |
| 2025/0028750 A1* | 1/2025 | Miculicich Werlen | |
| | | | G06F 40/284 |
| 2025/0094704 A1* | 3/2025 | Hu | H04L 51/02 |
| 2025/0094816 A1* | 3/2025 | Hu | H04L 51/02 |
| 2025/0097171 A1* | 3/2025 | Hu | G06F 8/35 |
| 2025/0148216 A1* | 5/2025 | Huang | G06F 40/35 |
| 2025/0158942 A1* | 5/2025 | Rodgers | G06F 40/20 |

OTHER PUBLICATIONS

Baidya et al., "The Behavior Gap: Evaluating Zero-Shot LLM Agents in Complex Task-Oriented Dialogs", arXiv:2506.12266v1 [cs.CL], 18 pages, Jun. 13, 2025.

* cited by examiner

*Primary Examiner* — Eric Yen
(74) *Attorney, Agent, or Firm* — DLA PIPER LLP (US)

(57) ABSTRACT

At least one processor may receive conversation data comprising a user input and a response to the user input generated by a large language model (LLM). The at least one processor may detect a behavior gap between the conversation data and at least one test conversation data comprising human-to-human communication samples. Based on the behavior gap, the at least one processor may retrain the LLM and/or provide an alternative response workflow for responding to the user input.

20 Claims, 16 Drawing Sheets

400

```
*Task Description*
You are a multi-domain customer support assistant for booking various services in Cambridge, UK,
including hotel bookings, restaurant reservations, train bookings, taxi bookings, and finding
attractions. All the services and information you provide are specific to Cambridge, UK and its
surrounding areas.

*Database Details*
Available options in the database:
Areas in Cambridge: west, centre, south, east, north
Train Departure Stations: leicester, kings lynn, cambridge, ...
Train Arrival Stations: leicester, kings lynn, cambridge, ...
Hotels: alpha-milton guest house, archway house, autumn house, ...
Hotel Types: hotel, guesthouse
Attractions: cambridge artworks, whale of a time, clare college, ...
Attraction Types: entertainment, mutliple sports, college, ...
Restaurants: ugly duckling, prezzo, caffe uno,
Cuisines: portuguese, vietnamese, italian, ...

When users mention locations or entity names that don't exactly match but are similar to these
options, try to match them to the closest valid option. For example:
- If user says 'city center', match it to 'centre'
- If user mentions 'kings cross', match it to 'london kings cross'
- If user says 'fitzwilliam', match it to 'fitzwilliam museum'

*Important Guidelines*
Decide the next step based on the user's question:
- Ask clarifying questions if the input is ambiguous.
- Use the provided tools appropriately. Do not make up tools.
- Always review the conversation history before responding.
- Be polite and professional in your responses.
- Respond concisely and clearly.
```

```
*Task Description*
You are an expert in analyzing task-oriented dialogues. You are provided a conversation that contains
the user's input and the agent's response to the input. Your task is to analyze
the dialog acts present in the agent's response to a user input. A response can have multiple
dialog acts. For each dialog act, you must explain whether it is present or absent
in the agent's response.

*Dialog Act Types*
A dialog act represents the function of the agent's response. The possible dialog acts are:
- inform: Agent provides factual information or details relevant to the user query
- request: Agent asks user for specific missing information needed to fulfill their request
- select: Agent presents one or more options in response to the user's request and actively asks
user to choose between them
- recommend: Agent makes a specific suggestion with positive framing, often using phrases like
"I recommend", "I suggest", or "How about"
- nooffer: Agent explicitly states that no options exist matching user's criteria
- offerbook: Agent presents booking details and explicitly asks if user wants to proceed with
booking. Mostly occurs for train-related bookings
- book: Agent confirms a completed booking and usually provides certain details regarding the booking
- nobook: Agent states that a specific booking request cannot be completed
- greet: Agent responds to a user's indication that their needs have been met, typically
accompanied by gratitude. The response can range from simple acknowledgments to well-wishes related
to the service provided or a simple goodbye.
- reqmore: Explicitly asks if user needs additional help or has other requests

*Few-Shot Examples*
Here are some examples of each dialog acts where the user input is followed by the agent's
response and the dialog act is corresponding to the agent's response only:
```

```
inform user: Could I have their phone number please and type of cuisine they serve?
agent: They serve international food and their phone number is 01223 812660.

user: Hello I would like to find a restaurant in the west part of the city that costs a moderate amount.
agent: Prezzo is a moderately priced italian restaurant in the west part of town.

request user: Can you tell me what the travel time is and the price?
agent: Which train would you like that for?

user: It's important that I arrive no later than 23:30.
agent: Where will you be departing from?

...
...
...

******
Analyze the following conversation and list all dialog acts that apply. Multiple acts can be present
in a single response.

Latest user input:
{user_input}

Latest agent response:
{response}
```

*Task Description*
You are an expert in analyzing task-oriented dialogues. You are provided a conversation that contains the current user input and an AI agent's response to it. Your task is to analyze the tools used by the AI agent to generate the response. Multiple tools can be used in a single response. For each tool, you must explain if and why it has been used or not by the agent for the current response.

*AI Agent Description*
The AI agent whose response you are analyzing is a multi-domain customer support assistant for booking various services in Cambridge, UK, including hotel bookings, restaurant reservations, train bookings, taxi bookings, and finding attractions. All the services and information it provides are specific to Cambridge, UK and its surrounding areas.

*Available Tools*
The AI agent uses the following tools to generate responses:

1. FindHotels: The agent uses this tool to find hotels in Cambridge, UK. The agent provides information about the hotel, such as its name, location, price, rating, etc. The agent generally uses this tool to recommend one or more hotels to the user.
2. FindRestaurants: The agent uses this tool to find restaurants in Cambridge, UK. The agent provides information about the restaurant, such as its name, location, cuisine, price, rating, etc. The agent generally uses this tool to recommend one or more restaurants to the user.
3. FindAttractions: The agent uses this tool to find attractions in Cambridge, UK. The agent provides information about the attraction, such as its name, location, type, price, rating, etc. The agent generally uses this tool to recommend one or more attractions to the user.
4. FindTrains: The agent uses this tool to find trains in Cambridge, UK. The agent provides information about the train, such as its name, departure time, arrival time, duration, price, etc. The agent generally uses this tool to recommend one or more trains to the user.
5. BookHotel: The agent uses this tool to book a hotel in Cambridge, UK. The agent may provide information about the booking, such as the hotel name, check-in date, check-out date, number of guests, price, etc. The agent generally uses this tool to confirm that the booking was successful or not and provide details.
6. BookRestaurant: The agent uses this tool to book a restaurant in Cambridge, UK. The agent provides information about the booking, such as the restaurant name, reservation date, reservation time, number of guests, price, etc. The agent generally uses this tool to confirm that the booking was successful or not and provide details.
7. BookTrain: The agent uses this tool to book a train in Cambridge, UK. The agent provides information about the booking, such as the train name, departure time, arrival time, number of passengers, and price. The agent generally uses this tool to confirm that the booking was successful or not and provide details.
8. BookTaxi: The agent uses this tool to book a taxi in Cambridge, UK. The agent provides information about the booking, such as the pickup location, drop-off location, pickup time, number of passengers, and price. The agent generally uses this tool to confirm that the booking was successful or not and provide details.

```
*Few-Shot Examples*
Here are some examples of each tool usage where the user input is followed by the agent's
response and the agent uses that tool to generate its response:

FindHotels
user: Great! Yes, I'll also need to find a hotel with free parking and free wifi.
agent: I would recommend the ashley hotel.

FindRestaurants
user: Could I have their phone number please and type of cuisine they serve?
agent: They serve international food and their phone number is 01223 812660.

******
Analyze the following conversation and list all the tools used by the AI agent to generate the
response. Multiple tools can be used in a single response. You must explain if and why each tool
has been used or not by the agent for the current response and provide a list of all tools
used by the agent for the current response based on your analysis.

User input:
{user_input}

Agent response:
{response}
```

FIG. 8B

```
*Task Description*:
You are an expert task-oriented dialog system evaluator. Your task is to evaluate the agent response
and provide feedback on the quality of the response based on the conversation history and the
current user input.

*Evaluation Metrics*
1. Coherence (Flow and connection with context):
    Score 1: Completely disconnected from context, ignores previous conversation
    Score 2: Barely acknowledges context, major inconsistencies
    Score 3: Basic connection to context, some flow issues
    Score 4: Good connection to context, minor flow issues
    Score 5: Perfect flow and connection, fully integrates context 2. Specificity (Level of detail and precision):
    Score 1: Extremely vague, no concrete information
    Score 2: Minimal details, mostly general statements
    Score 3: Basic details, some specific information
    Score 4: Detailed information, most aspects covered
    Score 5: Comprehensive details, precise information about all aspects 3. Satisfaction (Likelihood of meeting user needs):
    Score 1: Completely fails to address user needs
    Score 2: Minimally addresses user needs, requires multiple follow-ups
    Score 3: Partially addresses needs, requires some clarification
    Score 4: Mostly addresses needs, minor clarification needed
    Score 5: Fully addresses all user needs, no clarification needed 4. Effectiveness (How well the response addresses the user input):
    Score 1: Completely misses the point of the input
    Score 2: Barely addresses the input, major gaps
    Score 3: Addresses main point but misses details
    Score 4: Addresses input well with minor omissions
    Score 5: Perfectly addresses all aspects of the input
```

```
*Evaluation Guidelines*
You have to evaluate the response using 4 metrics (coherence, specificity, satisfaction,
effectiveness) on a scale of 1-5 for each metric. Follow these guidelines:
- Break down evaluation into specific aspects
- Consider both explicit and implicit requirements
- Provide concrete examples in reasoning
- Be consistent in scoring across evaluations
- Avoid position and length biases
- Avoid defaulting to the highest score; a lot of the times, responses will have some room for
improvement
- Be strict in your scoring. A score of 5 should only be given for truly exceptional responses that
meet all criteria perfectly
- Focus on quality over quantity

******
Analyze the following conversation and provide a score for each of the evaluation metric. You must
provide a reasoning to justify your score for each metric.

Conversation History
{context}

Current User Input
{current_input}

Agent Response**:
{response}
```

FIG. 10B

LARGE LANGUAGE MODEL PERFORMANCE EVALUATION AND MODIFICATION

BACKGROUND

Large Language Models (LLMs) are used in a wide variety of applications, such as task oriented dialog systems (TODS), but continue to face notable performance challenges, especially in zero-shot scenarios. While prior work has noted performance gaps in these situations, the behavioral factors driving the performance gap remain underexplored. However, the behavior gap, a gap between how LLMs behave and how human experts behave, can be a factor negatively impacting the performance of LLM agents. For example, as task complexity increases, the behavior gap widens, leading to a degradation of agent performance on complex task-oriented dialogs. Even relatively state-of-the-art agents such as GPT-4o-based agent exhibits low alignment with human behavior, excessive and often misaligned tool usage, and ineffective usage of external knowledge.

BRIEF DESCRIPTIONS OF THE DRAWINGS

FIG. 4 shows an example agent system prompt according to some embodiments of the disclosure.

FIGS. 6A-6B show an example dialog act behavior gap determination system prompt according to some embodiments of the disclosure.

FIGS. 8A-8B show an example tool use behavior gap determination system prompt according to some embodiments of the disclosure.

FIGS. 10A-10B show an example response quality evaluation system prompt according to some embodiments of the disclosure.

DETAILED DESCRIPTION OF SEVERAL EMBODIMENTS

Systems and methods described herein can improve LLM performance by identifying behavior gap issues and correcting them. For example, systems and methods described herein can apply a comprehensive evaluation framework to measure the behavior gap across one or more of three behavioral dimensions. One dimension is dialog acts, which can represent an utterance at the level of illocutionary force. A second dimension is tool usage, and a third dimension is external knowledge usage, which modern LLM agents increasingly leverage for TODS. Systems and methods described herein can apply the framework in a teacher-forcing setting to avoid user simulators that can introduce bias and/or discrepancies and to ensure broad, rather than implementation-specific, applicability.

Systems and methods described herein may reveal significant behavioral gaps between LLM agents and human experts across at least three tasks of varying complexity levels. Specifically, LLMs may exhibit misalignment in dialog acts, excessive but often incorrect tool usage, and inefficient representation of external knowledge. These gaps may become especially pronounced as the LLM moves from relatively simple slot-filling tasks to more complex ones, such as those exhibited in the product customer support (PCS) dataset or real-world customer-human expert interactions. The behavior gap can negatively impact LLM agent performance, and reducing this gap can lead to statistically significant improvements. To that end, systems and methods described herein may use an evaluation framework to comprehensively quantify the behavior gap between human experts and LLM agents across dialog acts, tool usage, and/or external knowledge usage dimensions. After identifying and quantifying such gaps, systems and methods described herein may implement remedial measures that can close the gaps, which may include training and/or tuning prior to deployment and/or in-process workflow modifications during deployment, for example. These LLM improvements may provide a technical solution to the behavioral gaps arising as a consequence of LLM internal functioning.

Evaluation and Modification System

Figure 1:
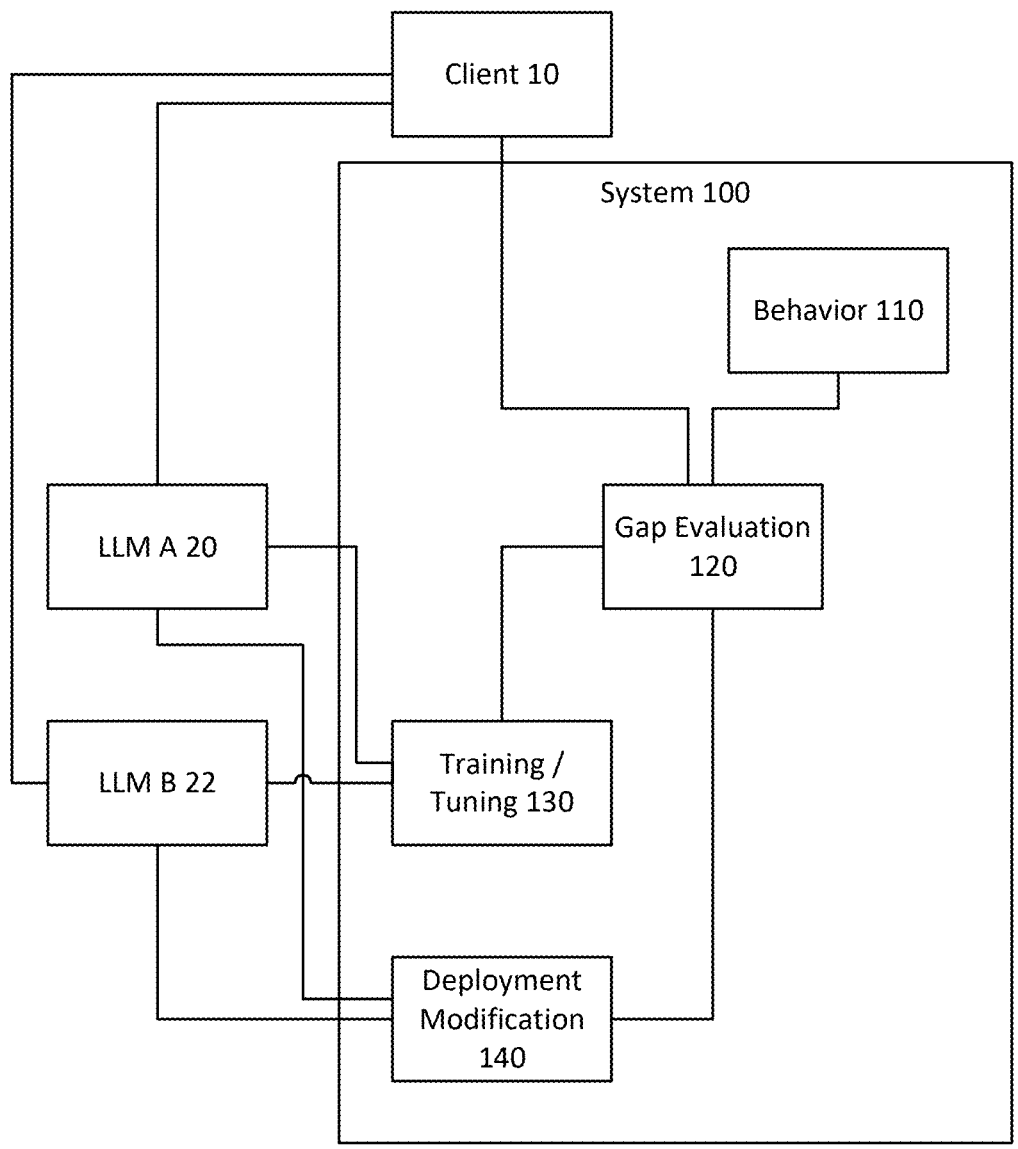
FIG. 1 shows an example large language model performance evaluation and modification system according to some embodiments of the disclosure.

FIG. 1 shows an example LLM performance evaluation and modification system 100 according to some embodiments of the disclosure. System 100 may include one or more modules, such as behavior module 110, gap evaluation module 120, training/tuning module 130, and/or deployment modification module 140, and/or may include or be in communication with one or more LLMs (in this example, two LLMs, LLM A 20 and LLM B 22, although other numbers of LLMs may be possible). The elements of system 100 are described in greater detail below with respect to FIGS. 2-12, but in general, system 100 can identify gaps between LLM 20, 22 performance and expert behavior and provide remedial measures to improve processing of client 10 queries by LLM 20, 22.

Illustrated components may include a variety of hardware, firmware, and/or software components that may interact with one another. Some components shown in FIG. 1 may communicate with one another using networks. For example, system 100 may communicate with client 10 and/or LLMs 20, 22 through one or more networks (e.g., the Internet, an intranet, and/or one or more networks that provide a cloud environment). In some embodiments, elements of system 100 may communicate with one another through the one or more networks. Each component may be implemented by one or more computers (e.g., as described below with respect to FIG. 13).

Elements illustrated in FIG. 1 (e.g., system 100 (including behavior module 110, gap evaluation module 120, training/tuning module 130, and/or deployment modification module 140), client 10, LLM A 20, and LLM B 22) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one client 10, two LLMs 20, 22, one system 100, one behavior module 110, one gap evaluation module 120, one training/tuning module 130, and one deployment modification module 140 are illustrated, this is for clarity only, and multiples of any of the above elements may be present. In practice, there may be single instances or multiples of any of the illustrated elements, and/or these elements may be combined or co-located. For example, a plurality of clients 10 may send prompts to system 100, LLM A 20, and/or LLM B 22.

In the following descriptions of how the illustrated components function, several examples are presented. However, those of ordinary skill in the art will appreciate that these examples are merely for illustration, and the disclosed embodiments are extendable to other application and data contexts.

Figure 2:
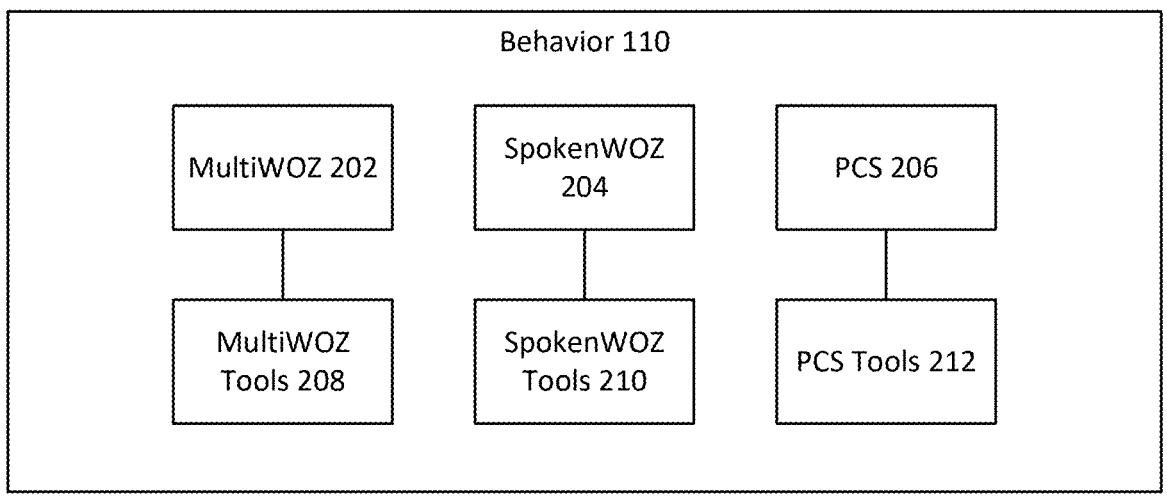
FIG. 2 shows an example behavior module according to some embodiments of the disclosure.
Figure 3:
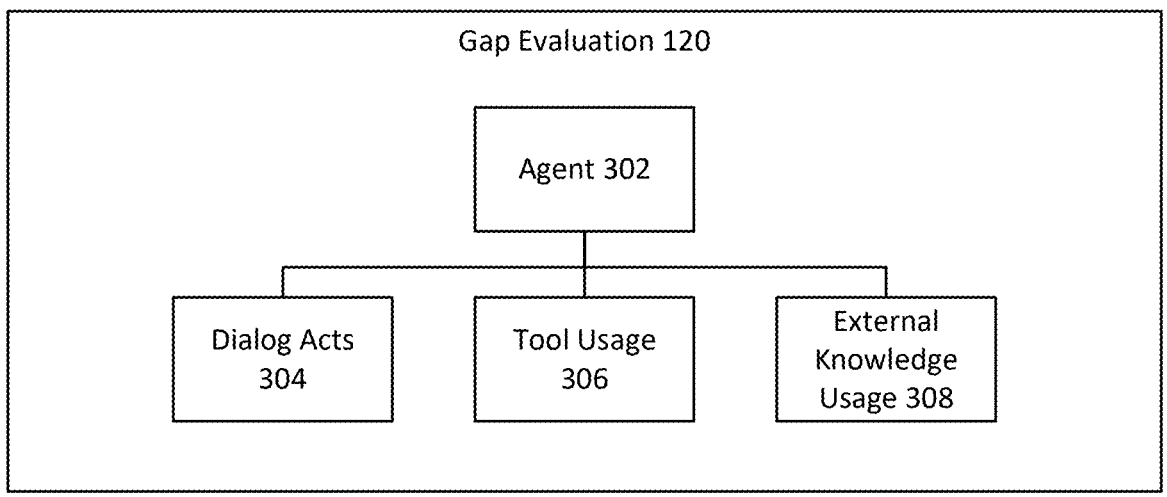
FIG. 3 shows an example gap evaluation module according to some embodiments of the disclosure.

FIGS. 2 and 3 show details of behavior module 110 and gap evaluation module 120, respectively, while FIG. 4 provides further details about the agent(s) of gap evaluation module 120. Following the description of these modules, FIGS. 5-11 describe processing to evaluate behavior gaps in LLM outputs and close the behavior gaps through training and/or runtime interventions.

FIG. 2 shows an example behavior module 110 according to some embodiments of the disclosure. As described in detail below, behavior module 110 may provide and/or maintain one or more datasets that may be used to evaluate LLM behavior gaps. For example, the datasets may include MultiWOZ 202, SpokenWOZ 204, and/or product customer support (PCS) 206. Each dataset may have an associated set of agent tools, such as MultiWOZ tools 208 for MultiWOZ 202, SpokenWOZ tools 210 for SpokenWOZ 204, and/or PCS tools 212 for PCS 206. As described in detail below, gap evaluation module 120 can use the agent tools to perform processing.

MultiWOZ 202 is a widely used benchmark for evaluating TOD systems. MultiWOZ 202 includes over 10,000 human-human written dialogs spanning seven domains: attraction, hospital, police, hotel, restaurant, taxi, and train. Its text-based modality and low average number of turns per dialog (e.g., 15 turns per dialog in some embodiments) make it the simplest among the three datasets in terms of complexity. Some embodiments may specifically utilize the test set of MultiWOZ 2.2 which includes 1,000 dialogs across five domains: hotel, attraction, restaurant, taxi, and train.

MultiWOZ tools 208 may be configured to allow an agent to perform information retrieval from the MultiWOZ 202 database and booking across five domains: BookHotel, BookTaxi, BookRestaurant, BookTrain, FindHotels, FindAttractions, and FindRestaurants, FindTrains. For example, MultiWOZ tools 208 may equip the agent with one or more of the following functions. MultiWOZ tools 208 may include search tools enabling the agent to query the MultiWOZ 202 database to retrieve information about hotels (FindHotels), attractions (FindAttractions), restaurants (FindRestaurants), and trains (FindTrains) based on user preferences (e.g., location, price range). MultiWOZ tools 208 may include booking tools that can allow the agent to book hotels (BookHotel), restaurants (BookRestaurant), trains (BookTrain), and taxis (BookTaxi). To minimize hallucination and ensure accurate tool usage, MultiWOZ tools 208 may include an exhaustive list of all entities present in the MultiWOZ 202 database for inclusion in a system prompt. This can ensure that the agent can accurately identify valid entities during search and booking operations. MultiWOZ tools 208 may be known Python functions and/or may be modified or created from scratch to provide similar functionality to the known Python functions and/or additional functionality.

SpokenWOZ 204 builds upon MultiWOZ 202 by introducing human-to-human spoken conversations to address challenges associated with spoken language. SpokenWOZ 204 was constructed from human-to-human spoken conversations conducted via phone calls and transcribed to text. This introduces additional complexity due to unique challenges inherent in spoken conversation such as incomplete utterances. The average number of turns per dialog can increase relative to MultiWOZ 202 (e.g., in some embodiments 36 turns per dialog for SpokenWOZ 204), reflecting the more verbose nature of spoken interactions compared to written ones. Some embodiments may use a subset of the SpokenWOZ test set that aligns with the five domains used in MultiWOZ: hotel, attraction, restaurant, taxi, and train, resulting in a test set including 987 dialogs SpokenWOZ tools 210 may incorporate some or all of the MultiWOZ tools 208 along with an additional BookParking tool for the agent. BookParking may enable the agent to book parking spaces for users when requested. Similar to MultiWOZ tools 208, SpokenWOZ tools 210 may include an exhaustive list of entities for insertion into the system prompt to reduce hallucination and ensure accurate tool usage. SpokenWOZ tools 210 may include functionality such that once the user's booking is successful, the agent may be prompted to not only provide the entity booked but also ask for the user's profile information such as name, ID, email, license plate number, and phone. SpokenWOZ tools 210 may be known Python functions and/or may be modified or created from scratch to provide similar functionality to the known Python functions and/or additional functionality.

PCS 206 is a private dataset and may provide the most complex scenario for behavior module 110. PCS 206 includes real-world transcribed spoken conversations between customers and human expert agents in a customer support setting. These dialogs involve tasks that require multi-step reasoning, such as troubleshooting, and display a variety of intents and actions from both the agent and user. A snippet from a sample conversation is demonstrated as follows:

Agent: Thank you for calling [PRODUCT NAME]. My name is [PII], can I have your name, please?

Customer: My name is [PII].

Agent: Hi [PII], how are you doing today?

Customer: I'm doing fine, thank you.

Agent: How can I help you?[PII].

Customer: I have [PRODUCT NAME]. And I'm trying to, you know, I've downloaded transactions and I would like to deposit them and match them with the transactions, but I'm doing something wrong because it seems to take the deposits but it's not matching with the downloads.

Agent: Hello. I see. And what is the year version of the [PRODUCT NAME] you have?

Customer: It is [VERSION][PRODUCT NAME].

Agent: All right. And what do you mean by it's not matching with the transactions that you have? So you enter, have you entered transactions manually inside [PRODUCT NAME] and then you download the transactions on your bank?

The dialogs can be filtered based on the impact of the agent's response on user satisfaction, as judged by GPT-4o or another LLM in some embodiments, so the human agent responses can serve as a proxy for high-quality standards. This dataset can contain 832 dialogs with an average of 120 turns per dialog in some embodiments, for example.

PCS tools 212 may include one or more specialized tools, based on human tool usage patterns, that may allow the agent to look up external knowledge base and simulate screen share, customer information look up, and escalation or transfer to other departments. The PCS 206 dataset may present unique challenges due to its real-world nature and diverse task requirements. Unlike traditional slot-filling tasks, this task does not have a predefined list of slots due to significant variations in individual user circumstances and the inherent complexity of the service. The complexity also comes from the spoken characteristics, such as incomplete utterances and back-channel. To enable agent to process such complexity, PCS tools 212 may include ScreenShare, KnowledgeLookup, CustomerInfoLookup, and/or EscalateOrTransfer tools. KnowledgeLookup may allow the agent to search an internal knowledge base as well as the internet for product-related information. CustomerInfoLookup may simulate the agent retrieving customer-specific information. EscalateOrTransfer may simulate the agent escalating unresolved issues to other teams or departments when necessary. ScreenShare may simulate initiating a screen-sharing session with the customer. The Customer Info Lookup, Escalation, and ScreenShare tools may not necessarily return specific information but instead may provide confirmation of their usage. This design can ensure that the behavior analysis focuses on when and how tools were invoked rather than the detailed content of their outputs. The KnowledgeLookup tool, in contrast, may be fully implemented to return detailed responses containing information such as relevant product information, troubleshooting guides, etc. PCS tools 212 may be known Python functions and/or may be modified or created from scratch to provide similar functionality to the known Python functions and/or additional functionality.

MultiWOZ 202, SpokenWOZ 204, and/or PCS 206 may be chosen to represent an increasing amount of complexity, defined by factors such as the average number of dialog turns and the variety of intents and actions. This progression in complexity can allow system 100 to systematically evaluate how behavior gap scales with task difficulty and how it impacts the overall task performance.

FIG. 3 shows an example gap evaluation module 120 according to some embodiments of the disclosure. As described in detail below, gap evaluation module 120 can utilize a comprehensive framework to systematically analyze the behavior gap between LLM-based agents and human experts This framework may include metrics to quantify the behavior gap across dialog acts, tool usage, and knowledge integration; a teacher-forcing approach for controlled evaluation; performance measures that can reveal the relationship between the behavior gap and agent performance; and/or task complexity measurements with two complementary metrics in some embodiments. Using this framework, gap evaluation module 120 may evaluate the behavior and performance of LLM agents across three tasks of varying complexity in some embodiments.

Gap evaluation module 120 can include agent 302. Agent 302 may be configured to access and use tools, such as MultiWOZ tools 208, SpokenWOZ tools 210, and/or PCS tools 212 described above with reference to FIG. 2. In some embodiments, agent 302 may be a zero-shot agent configured to operate in a multi-turn dialog setting, where agent 302 can process user inputs, reason about task requirements, and invoke appropriate tools to achieve task objectives. Agent 302 may not be required to rely on task-specific fine-tuning in some embodiments. Agent 302 may leverage pre-trained language models for natural language understanding and reasoning. For example, agent 302 may employ state-of-the-art pretrained language models such as GPT-4o, GPT-3.5 Turbo, LlaMA-3.3-70B-Instruct, and/or others. In some embodiments, agent 302 may use the ReAct framework, which combines Chain of Thought style reasoning and acting capabilities. This framework is designed to handle complex task-oriented dialogs by utilizing natural language understanding, reasoning, and action execution. In some embodiments, agent 302 may be implemented using LangGraph.

Agent 302 may be configured to systematically analyze and compare the behavior of LLM agents and human experts by conducting a detailed turn-by-turn analysis of their responses. The analysis may include dialog acts processing 304, which may allow agent 302 to analyze the dialog acts present in each response, tool usage processing 306, which may allow agent 302 to analyze the tools invoked during the conversation, and/or external knowledge usage processing 308, which may allow agent 302 to analyze the use of external knowledge to address user queries. These are among the basic elements that may affect the multi-turn dialog strategy.

Dialog acts processing 304 may employ frameworks such as the following, alone or in combination, to annotate the turn-by-turn dialog acts present in each response. In some embodiments, dialog acts processing 304 may use a task-specific WOZ framework, a taxonomy that may be used to analyze dialog acts in tasks such as MultiWOZ, SpokenWOZ, and similar TOD datasets. This framework may comprehensively capture conversational scenarios across multiple domains present in these tasks. Specifically, dialog acts processing 304 may consider 10 dialog act types in some embodiments: inform, request, select, recommend, nooffer, offerbook, book, nobook, greet, and reqmore.

In some embodiments, dialog acts processing 304 may use a task-independent ISO framework which may provide a task-independent and comprehensive dialog act taxonomy grounded in the dynamic interpretation theory (DIT) for dialogs. In some embodiments, the dialog act types included in this framework may include set_q, prop_q, choice_q, other_q, inform, commissives, directives, salutation, apology, thanking, and feedback. These acts can capture conversational scenarios for open-domain human-machine conversations.

These two frameworks combined may allow dialog acts processing 304 to systematically evaluate the dialog acts for both LLM agents and human experts across tasks. In some embodiments, dialog acts processing 304 may use the WOZ framework to evaluate the MultiWOZ and SpokenWOZ tasks, since this framework may cover all possible scenarios in these two tasks. However, dialog acts processing 304 may adopt the more flexible ISO framework for the open-ended PCS task.

In some embodiments, dialog acts processing 304 may include one or more LLM-based dialog act classifiers. To analyze the responses based on the above frameworks, dialog acts processing 304 may employ two GPT-4o-based few-shot classifiers for the two (WOZ and ISO) frameworks, respectively, in some embodiments. Given the user input and the corresponding system response, the output of the classifiers may include a list of predicted dialog act types present in the system response. To annotate an entire dialog, each set of turns (the user input and the corresponding system response) may be processed one at a time.

Both classifiers were validated against ground-truth annotations from the MultiWOZ dataset for the WOZ framework and the DialogBank dataset for the ISO framework. Dialog act classification, being a multi-label classification task where each turn can carry multiple labels (dialog act types), was evaluated using the micro-F1 score. This metric was chosen because it aggregates true positives, false positives, and false negatives across all labels-offering a robust performance measure that mitigates class imbalance. The WOZ and ISO classifiers achieved overall micro-F1 score of 0.771 and 0.745, respectively. Both classifiers performed significantly better than chance, demonstrating their reliability.

Tool usage processing 306 may compare tool usage patterns between the LLM agent and the human expert. In some embodiments tool usage processing 306 may include an LLM (e.g., GPT4o)-based few-shot tool classifier. The classifier may annotate tools used in human expert responses, as ground-truth tool usage for LLM agents may be available. Since each task can involve a unique set of tools, tool usage processing 306 may include task-specific classifiers tailored for each of the three tasks: MultiWOZ, SpokenWOZ, and PCS. The ground-truth tool usage from LLM agent responses may be used to validate the three classifiers. Like dialog act classification, this task is a multi-label classification problem, and the micro-F1 score can be used for evaluation. The MultiWOZ, SpokenWOZ, and PCS classifiers achieved micro-F1 scores of 0.893, 0.898, and 0.748 in validation testing, respectively. All classifiers performed significantly above chance, confirming their reliability.

External knowledge usage processing 308 may compare how LLM agents and human experts utilize retrieved external knowledge. In some embodiments, external knowledge usage processing 308 may focus on turns where the agents used tools designed to specifically access external knowledge (e.g., the search tools for querying the MultiWOZ database in the MultiWOZ and SpokenWOZ tasks and the knowledge lookup tool for the PCS task). In some embodiments, external knowledge usage processing 308 may use two metrics to analyze the retrieved knowledge usage. ROUGE-1 Precision is a first metric that external knowledge usage processing 308 may use to measure how much of the retrieved knowledge was directly copied into the response. Compression ratio is a second metric that external knowledge usage processing 308 may use to measure the efficiency of condensing retrieved knowledge into the response, where compression ratio may be given as: compression ratio=1−(Response length/Knowledge length), and where length may be measured by the number of words. It may be assumed that human experts retrieved the same external knowledge as LLM agents, so the knowledge length can be held identical for both.

Gap evaluation module 120, including agent 302, may be configured to systematically evaluate the effectiveness of LLM agents in TODS using a framework comprising two components in some embodiments: a teacher-forcing evaluation approach to compare LLM and human behavior in identical contexts, and an LLM-based evaluator to assess response quality across multiple dimensions.

Existing TODS studies often employ a user simulator to evaluate the final performance of an LLM agent. User simulators, while useful, may fail to capture the nuanced nature of human behavior. This failure can cause errors that can compound across multiple turns, potentially amplifying errors in performance evaluation. To address this, agent 302 may adopt a teacher-forcing evaluation approach. Originally referring to feeding ground-truth outputs back into a model during training, agent 302 may adapt this concept by providing the previous conversation between the human user and human expert as context. Assuming the list $\{a_0, u_0, a_1, u_1, \ldots, a_n, u_n\}$ represents the utterances between the human expert (ai) and human user (ui) in time order, $\{a_0, u_0, a_1, u_1, \ldots, u_{t-1}\}$ may be input as the context to the LLM agent to obtain the generated response gt, to be compared with the human agent response at. This may allow agent 302 to directly compare the LLM agent's behavior with that of the human expert in the same context.

Agent 302 may also implement an evaluator (e.g., using an LLM such as GPT-4o) to assess the agent performance at the turn level. The evaluator may receive the user input, the conversation history up to the given turn, and the corresponding agent's response. The evaluator may rate the agent's response across four aspects: dialog coherence, information detail and precision, understanding user needs, and/or user satisfaction. In some embodiments, each metric may be scored on a scale of 1 to 5, where 1 can indicate a completely inadequate or incorrect response, and 5 can indicate a high-quality response meeting all criteria. In other embodiments, other scoring methodologies may be used.

In the absence of ground-truth turn-level performance scores, the evaluator may be validated by comparing aggregated dialog-level scores for each metric against ground-truth dialog success rates on the MultiWOZ task. Dialogs with a success rate of 1 scored significantly higher ($p<0.05$) across all metrics compared to those with a success rate of 0, demonstrating that the LLM-based evaluator is relatively reliable at assessing agent performance.

Agent 302 may evaluate task complexity. For example, some embodiments may use two complementary metrics to quantify task complexity for each dataset. Normalized turn count may be used as a first metric to measure complexity in terms of dialog length: Normalized Turn Count=$(\ln(1+t))/(\ln(1+t+C))$, where t is average number of turns per chat and C is a constant number.

Dialog act diversity may be used as a second metric to measure complexity from the perspective of dialog acts: Dialog Act Diversity=$d/d_{max}$, where d is the average number of distinct dialog acts per chat, and dmax is the maximum number of available dialog acts. Some embodiments may use the ISO dialog act framework to ensure this metric is applicable across all tasks.

According to these metrics, task complexity may increase progressively from the slot-filling tasks, MultiWOZ and SpokenWOZ, to the more challenging PCS dataset.

The two metrics used to assess task complexity may be complementary. For instance, a lengthy conversation consisting solely of simple yes/no exchanges may result in a high Normalized Turn Count but may remain fundamentally simple. In such cases, Dialog Act Diversity may remain low. Conversely, Dialog Act Diversity can be high even for single-turn conversations if they involve complex responses featuring multiple dialog acts. In these scenarios, Normalized Turn Count may provide additional context. In some embodiments, both metrics may be normalized to a range between 0 and 1. To derive an overall measure of task complexity, the average of the two metrics may be computed and used.

Agent 302 may be equipped with and/or access tools depending on dataset used and/or processing being performed. For example, for the MultiWOZ 202 dataset, agent 302 may use MultiWOZ tools 208, which may allow information retrieval and booking across five domains: hotel, attraction, restaurant, taxi, and train. In some embodiments, agent 302 may use search tools and/or booking tools included in the MultiWOZ tools 208. Search tools may enable agent 302 to query the MultiWOZ 202 dataset to retrieve information about hotels (FindHotels), attractions (FindAttractions), restaurants (FindRestaurants), and trains (FindTrains) based on user preferences (e.g., location, price range). Booking tools may enable agent 302 to to book hotels (BookHotel), restaurants (BookRestaurant), trains (BookTrain), and taxis (BookTaxi). To minimize hallucination and ensure accurate tool usage, agent 302 may be provided with an exhaustive list of all entities present in the MultiWOZ 202 dataset as part of its system prompt. This may ensure that agent 302 can accurately identify valid entities during search and booking operations.

SpokenWOZ 204 may build upon MultiWOZ 202 by introducing additional complexity due to its spoken modality. Accordingly, SpokenWOZ tools 210 may include MultiWOZ tools 208 (e.g., search and booking tools) along with an additional tool, BookParking. BookParking may enable agent 302 to book parking spaces for users when requested. Similar to MultiWOZ, agent 302 may be provided with an exhaustive list of entities in the system prompt to reduce hallucination and ensure accurate tool usage. Additionally, once the user's booking is successful, agent 302 may be prompted to not only provide the entity booked but also ask for the user's profile information such as name, ID, email, license plate number, and phone.

PCS 206 may present unique challenges due to its real-world nature and diverse task requirements. Unlike traditional slot-filling tasks, this task does not have a predefined list of slots due to significant variations in individual user circumstances and the inherent complexity of the service. The complexity also comes from the spoken characteristics, such as incomplete utterances and back-channel. PCS tools 212 for this dataset may equip agent 302 with four specialized tools based on tool usage pattern from the human experts. For example, PCS tools 212 may include KnowledgeLookup which can allow agent 302 to search an internal knowledge base as well as the internet for product-related information. PCS tools 212 may include CustomerInfoLookup which may simulate agent 302 retrieving customer-specific information. PCS tools 212 may include EscalateOrTransfer which may simulate agent 302 escalating unresolved issues to other teams or departments when necessary. PCS tools 212 may include ScreenShare which may simulate initiating a screen-sharing session with the customer. The Customer Info Lookup, Escalation, and ScreenShare tools may not return specific information in some embodiments, but instead may provide confirmation of their usage. This design can ensure that the behavior analysis focuses on when and how tools were invoked rather than the detailed content of their outputs. The KnowledgeLookup tool, in contrast, may be fully implemented returning detailed responses containing information such as relevant product information, troubleshooting guides, etc.

Agent 302 may include and/or be analyzed using a task-specific WOZ framework based on the dialogue act types defined in the MultiWOZ 2.2 dataset. This framework may be used for analyzing agent 302 performance on the MultiWOZ 202 and SpokenWOZ 204 datasets. It may include ten dialogue act types: inform, request, select, recommend, nooffer, offerbook, book, nobook, greet, and reqmore. In combination, these acts may capture conversational behaviors in the MultiWOZ 202 and SpokenWOZ 204 datasets. To ensure clarity and avoid overlapping definitions that might confuse an LLM-based classifier, certain act types that were originally present in the MultiWOZ 2.2 dataset may be merged. For example, the greet act may combine similar acts such as "welcome," "greet," "bye," and "thanks" from MultiWOZ into a single unified category. The book act may combine both "book" and "offerbooked" into one category since they may be closely related in function. These modifications can simplify the annotation process while preserving the semantic distinctions useful for analyzing dialogue actions.

FIG. 4 shows an example agent system prompt 400 according to some embodiments of the disclosure. This example is for a zero-shot MultiWOZ agent. Example system prompt 400 may include a task description, database details with various entities listed, matching instructions, and guidelines. An exhaustive list of entities may be provided in a real system prompt. However, for brevity, only a few are demonstrated in example system prompt 400.

Evaluation Methods

FIGS. 5-9 show examples of processing by which system 100 can determine behavior gaps for different behaviors evidenced by conversation data. These behaviors can include dialog acts, tool use, and/or external knowledge use, for example.

Figure 5:
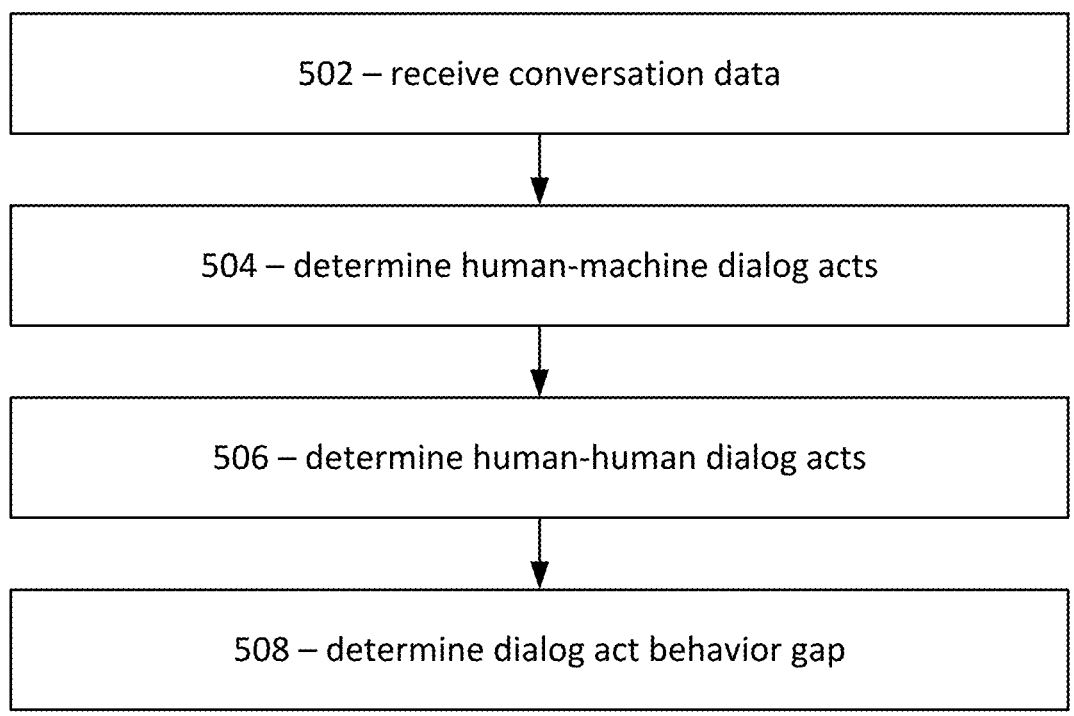
FIG. 5 shows an example dialog act behavior gap determination process according to some embodiments of the disclosure.

FIG. 5 shows an example dialog act behavior gap determination process 500 according to some embodiments of the disclosure. Behavior module 110 and/or gap evaluation module 120 of system 100 may perform process 500 to identify dialog acts within conversation data and identify behavior gaps between human-machine and human-human dialog acts.

At 502, behavior module 110 can receive and/or provide conversation data. Conversation data can include some or all content of the MultiWOZ 202 dataset, SpokenWOZ 204 dataset, and/or PCS 206 dataset. In some embodiments, conversation data can additionally or alternatively include records from one or more ongoing or previous communication sessions involving two humans (e.g., a person with questions and a subject matter expert addressing the questions) and/or a human and a machine (e.g., an LLM such as LLM A 20 and/or LLM B 22).

At 504, gap evaluation module 120 can determine human-machine dialog acts from the conversation data. For example, gap evaluation module 120 can detect at least one dialog act in the conversation data. In some embodiments, this detection can include prompting a test LLM with a dialog act system prompt and the conversation data including human-machine conversation records and receiving the at least one dialog act in a response generated by the test LLM.

At 506, gap evaluation module 120 can determine human-human dialog acts from the conversation data. For example, gap evaluation module 120 can detect at least one dialog act in the conversation data. In some embodiments, this detection can include prompting a test LLM with a dialog act system prompt and the conversation data including human-human conversation records and receiving the at least one dialog act in a response generated by the test LLM.

At 508, gap evaluation module 120 can determine a dialog act behavior gap from the outcomes of processing at 504 and 506. For example, gap evaluation module 120 can evaluate the alignment of dialog acts between the human experts (from 506) and LLM agents (from 504) using a scoring algorithm such as the micro-F1 score. In the following example, discrepancy was quantified as 1−micro-F1 score. In at least one example, the overall discrepancy increased with task complexity (average correlation: 0.963), with highest differences observed in the PCS task. Smaller language models (e.g., Llama-3.3-70B-Instruct) exhibited higher discrepancies than larger language models. However, the behavior gap between models narrowed as task complexity increased, suggesting that even advanced models struggle with complex scenarios. Furthermore, LLM agents consistently used more dialog acts per turn compared to humans. In general, scoring can identify and quantify behavior gaps caused by differences in dialog acts.

FIGS. 6A-6B show an example dialog act behavior gap determination system prompt 600 according to some embodiments of the disclosure. This example prompt 600 is a system prompt for a WOZ dialog act classifier where ten few-shot examples were used per act. For brevity, only a subset of the examples are demonstrated in prompt 600. As shown, example system prompt 600 may include a task description, dialog act types, examples, and text from conversation data as received at 502. The user inputs and responses may be human-machine or human-human user inputs and responses depending on whether prompt 600 is used at 504 or at 506 of process 500, respectively.

Figure 7:
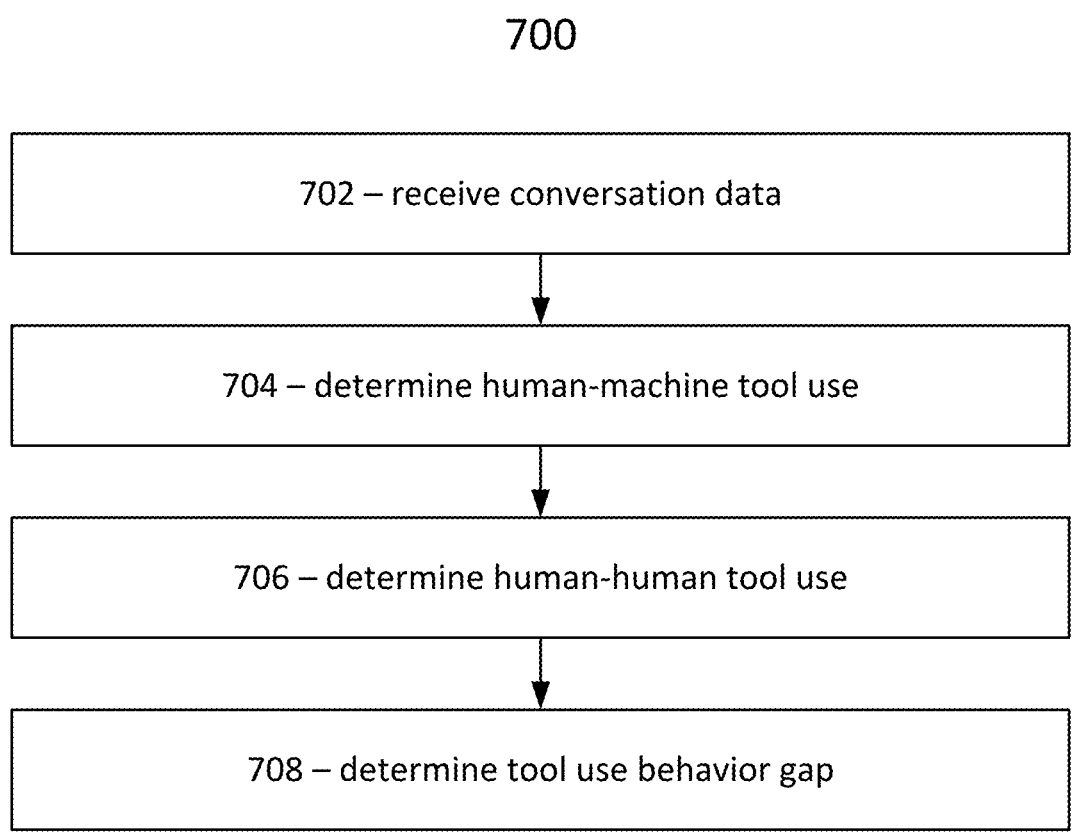
FIG. 7 shows an example tool use behavior gap determination process according to some embodiments of the disclosure.

FIG. 7 shows an example tool use behavior gap determination process 700 according to some embodiments of the disclosure. Behavior module 110 and/or gap evaluation module 120 of system 100 may perform process 700 to identify evidence of tool use within conversation data and identify behavior gaps between human-machine and human-human tool use.

At 702, behavior module 110 can receive and/or provide conversation data. Conversation data can include some or all content of the MultiWOZ 202 dataset, SpokenWOZ 204 dataset, and/or PCS 206 dataset. In some embodiments, conversation data can additionally or alternatively include records from one or more ongoing or previous communication sessions involving two humans (e.g., a person with questions and a subject matter expert addressing the questions) and/or a human and a machine (e.g., an LLM such as LLM A 20 and/or LLM B 22).

At 704, gap evaluation module 120 can determine human-machine tool use evidence from the conversation data. For example, gap evaluation module 120 can detect at least one tool use in the conversation data. In some embodiments, this detection can include prompting a test LLM with a tool use system prompt and the conversation data including human-machine conversation records and receiving an indication of the at least one tool use in a response generated by the test LLM.

At 706, gap evaluation module 120 can determine human-human tool use evidence from the conversation data. For example, gap evaluation module 120 can detect at least one tool use in the conversation data. In some embodiments, this detection can include prompting a test LLM with a tool use system prompt and the conversation data including human-human conversation records and receiving an indication of the at least one tool use in a response generated by the test LLM.

At 708, gap evaluation module 120 can determine a tool use behavior gap from the outcomes of processing at 704 and 706. For example, gap evaluation module 120 can evaluate the alignment of tool use between the human experts (from 706) and LLM agents (from 704) using a scoring algorithm such as the micro-F1 score. In the following example, discrepancy was quantified as 1−micro-F1 score. In at least one example, the overall discrepancy increased with task complexity (average correlation: 0.963), with highest differences observed in the PCS task. Smaller language models (e.g., Llama-3.3-70B-Instruct) exhibited higher discrepancies than larger language models. However, the behavior gap between models narrowed as task complexity increased, suggesting that even advanced models struggle with complex scenarios. Additionally, LLM agents tend to invoke tools more frequently than human experts, a trend that may be particularly pronounced in smaller models, which also exhibited higher discrepancies. These observations suggest that LLM agents (particularly smaller models) may adopt less efficient and more incorrect tool usage strategies relative to the human benchmark. In general, scoring can identify and quantify behavior gaps caused by differences in tool use.

FIGS. 8A-8B show an example tool use behavior gap determination system prompt 800 according to some embodiments of the disclosure. This example prompt 800 is a system prompt for a MultiWOZ tool classifier where ten few-shot examples were used per act. For brevity, only a subset of the examples are demonstrated in prompt 800. As shown, example system prompt 800 may include a task description, a listing of available tools, examples, and text from conversation data as received at 702. The user inputs and responses may be human-machine or human-human user inputs and responses depending on whether prompt 800 is used at 704 or at 706 of process 700, respectively.

Figure 9:
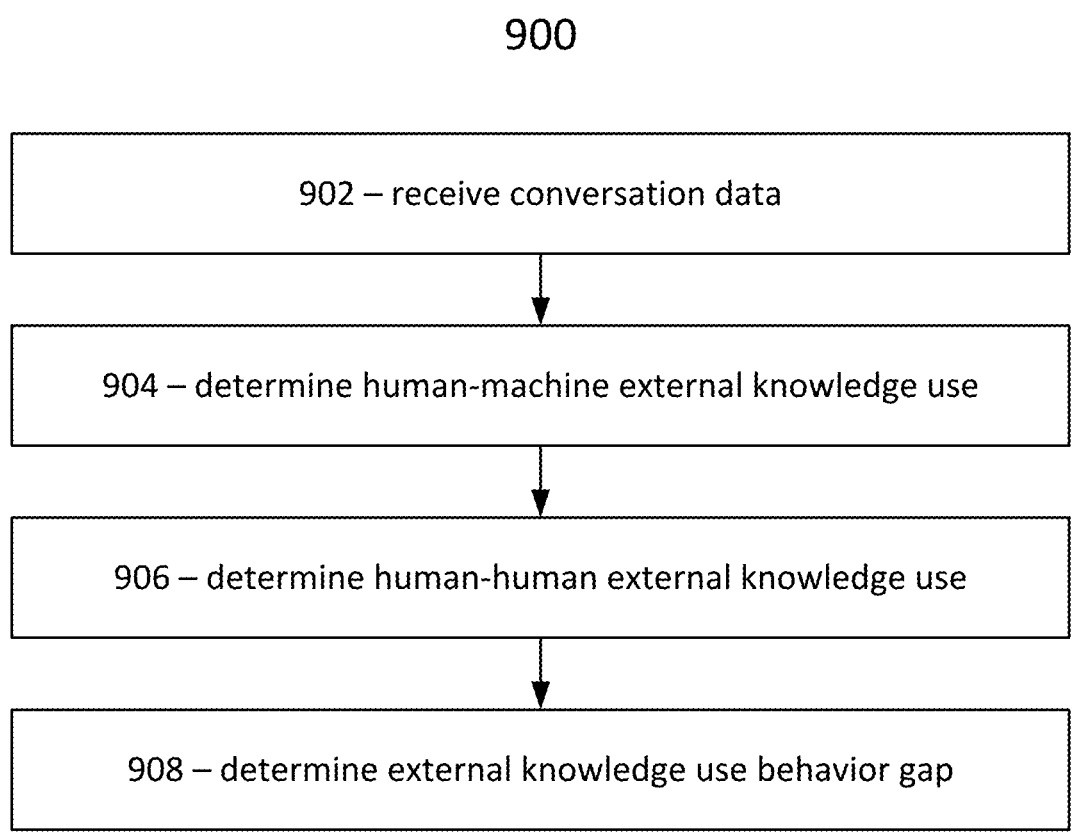
FIG. 9 shows an example external knowledge use behavior gap determination process according to some embodiments of the disclosure.

FIG. 9 shows an example external knowledge use behavior gap determination process 900 according to some embodiments of the disclosure. Behavior module 110 and/or gap evaluation module 120 of system 100 may perform process 900 to identify evidence of external knowledge use within conversation data and identify behavior gaps between human-machine and human-human external knowledge use.

At 902, behavior module 110 can receive and/or provide conversation data. Conversation data can include some or all content of the MultiWOZ 202 dataset, SpokenWOZ 204 dataset, and/or PCS 206 dataset. In some embodiments, conversation data can additionally or alternatively include records from one or more ongoing or previous communication sessions involving two humans (e.g., a person with questions and a subject matter expert addressing the questions) and/or a human and a machine (e.g., an LLM such as LLM A 20 and/or LLM B 22).

At 904, gap evaluation module 120 can determine human-machine external knowledge use evidence from the conversation data. For example, gap evaluation module 120 can detect at least one external knowledge use in the conversation data. In some embodiments, this detection can include prompting a test LLM with an external knowledge use system prompt and the conversation data including human-machine conversation records and receiving an indication of the at least one external knowledge use in a response generated by the test LLM. The detecting at least one external knowledge use can include detecting copying of external knowledge into a response to user input and/or determining a compression ratio of at least a portion of the response to the user input over referenced external knowledge.

At 906, gap evaluation module 120 can determine human-human external knowledge use evidence from the conversation data. For example, gap evaluation module 120 can detect at least one external knowledge use in the conversation data. In some embodiments, this detection can include prompting a test LLM with an external knowledge use system prompt and the conversation data including human-human conversation records and receiving an indication of the at least one external knowledge use in a response generated by the test LLM. The detecting at least one external knowledge use can include detecting copying of external knowledge into a response to user input and/or determining a compression ratio of at least a portion of the response to the user input over referenced external knowledge.

At 908, gap evaluation module 120 can determine an external knowledge use behavior gap from the outcomes of processing at 904 and 906. For example, gap evaluation module 120 can evaluate the alignment of external knowledge use between the human experts (from 906) and LLM agents (from 904) using one or more metrics. For example, the metrics can include ROUGE-1 precision and/or compression ratio. LLM agents can exhibit a higher propensity to verbosely "copy and paste" retrieved knowledge directly into their responses, in contrast to human experts who may be more adept at digesting and condensing the knowledge into meaningful insights. This propensity among LLM agents is evidenced by higher ROUGE-1 precision scores, which indicate the extent of direct copying from retrieved knowledge, and lower compression ratios, compared to human experts. This behavior can persist even when the agents are explicitly instructed to be concise and provided with concise human responses in the conversation history, as in the teacher-forcing setting. In general, scoring can identify and quantify behavior gaps caused by differences in external knowledge use.

Modification Methods

FIGS. 10A-12 show examples of processing by which system 100 can improve LLM performance by reducing or avoiding behavior gaps. For example, system 100 can retrain and/or retune LLMs and/or can perform interventions such as workflow modifications during deployment of a human-machine interface using LLMs.

FIGS. 10A-10B show an example response quality evaluation system prompt 1000 according to some embodiments of the disclosure. The prompt 1000 may be used by training/tuning module 130 and/or deployment modification module 140, along with and/or in place of results from processing by gap evaluation module 120 as described above with respect to FIGS. 5-9, to determine whether intervention may be warranted. As shown in FIGS. 10A-10B, the example prompt 100 can include a task description, evaluation metrics, evaluation guidelines, and conversation data to be evaluated.

As described in detail with reference to FIGS. 11 and 12, system 100 may use response quality evaluation system prompt 1000 and/or scores of one or more of the evaluation methods described herein to determine that intervention may improve LLM performance. Some embodiments may use a combination of evaluation methods and/or response quality evaluation system prompt 1000. Other embodiments may use only a subset thereof. For example, some embodiments may focus solely on dialog act discrepancy, as dialog acts form the foundation for the other two behavioral factors. Tool usage may be inherently tied to dialog acts in TODS. Similarly, external knowledge usage may be highly influenced by the dialog acts chosen after retrieving knowledge. For instance, a recommend act may require the agent to gather and digest all retrieved knowledge and present a specific suggestion. By concentrating on dialog act discrepancy, system 100 may also capture the core behavioral alignment underlying both tool and knowledge usage.

Figure 11:
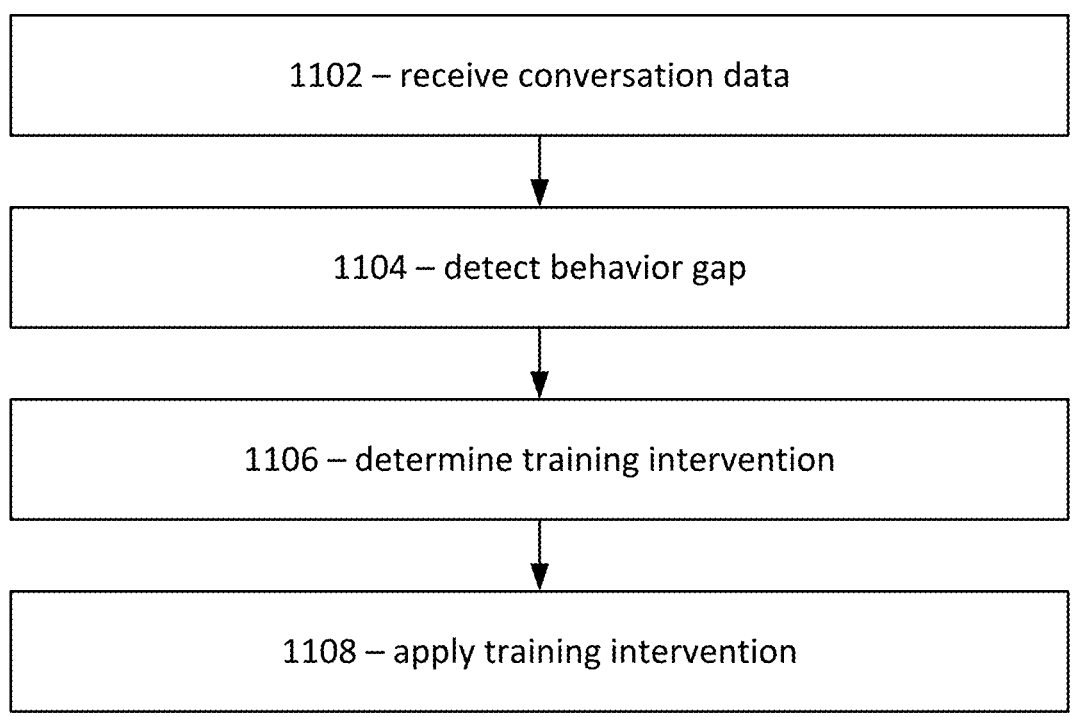
FIG. 11 shows an example training intervention process according to some embodiments of the disclosure.

FIG. 11 shows an example training intervention process 1100 according to some embodiments of the disclosure. Training/tuning module 130 may perform process 1100 to improve performance of LLM A 20 and/or LLM B 22 by retraining and/or retuning to reduce a behavior gap.

At 1102, training/tuning module 130 may receive conversation data including a user input and a response to the user input generated by one of the LLMs (for example, LLM A 20). In at least some embodiments, conversation data may also include some or all content of the MultiWOZ 202 dataset, SpokenWOZ 204 dataset, and/or PCS 206 dataset. In some embodiments, conversation data can additionally or alternatively include records from one or more ongoing or previous communication sessions involving two humans (e.g., a person with questions and a subject matter expert addressing the questions) and/or a human and a machine (e.g., an LLM such as LLM A 20 and/or LLM B 22).

At 1104, training/tuning module 130 may detect a behavior gap between the conversation data and at least one test conversation data comprising human-to-human communication samples (for example, where the text conversation data includes the MultiWOZ 202 dataset, SpokenWOZ 204 dataset, and/or PCS 206 dataset and/or ongoing/previous communication records received at 1102). Training/tuning module 130 may detect the behavior gap through any of the evaluation methods given above (e.g., process 500, 700, 900, and/or other processing described herein).

At 1106, training/tuning module 130 may determine a training intervention configured to reduce the behavior gap. For example, the training intervention may reduce the behavior gap by reducing a dialog act frequency in LLM responses, reducing a tool use frequency in LLM responses, reducing external knowledge copying in LLM responses, increasing a compression ratio for external knowledge use in LLM responses, or a combination thereof. The training intervention may include at least one of retraining the LLM and tuning at least one parameter of the LLM. At 1108, training/tuning module 130 may apply the training intervention, thereby retraining or retuning LLM 20 and reducing its behavior gap.

There may be various ways to determine and/or implement a training intervention. For example, in some embodiments, for each ground-truth response y and its context x, training/tuning module 130 can generate two responses given x, y1 and y2, and then use the evaluation framework described herein to rate these two responses. For example, system 100 can check which of the responses has a smaller dialog act and/or tool use discrepancy and/or better knowledge use by comparing y1 and y2. The better response has a smaller behavior gap. This builds a pairwise dataset that can be used with various post training algorithms, such as DPO, RLHF, or ORPO. Training/tuning module can use any of these existing training algorithms to fine-tune the LLM to reduce the expected behavior gap.

Figure 12:
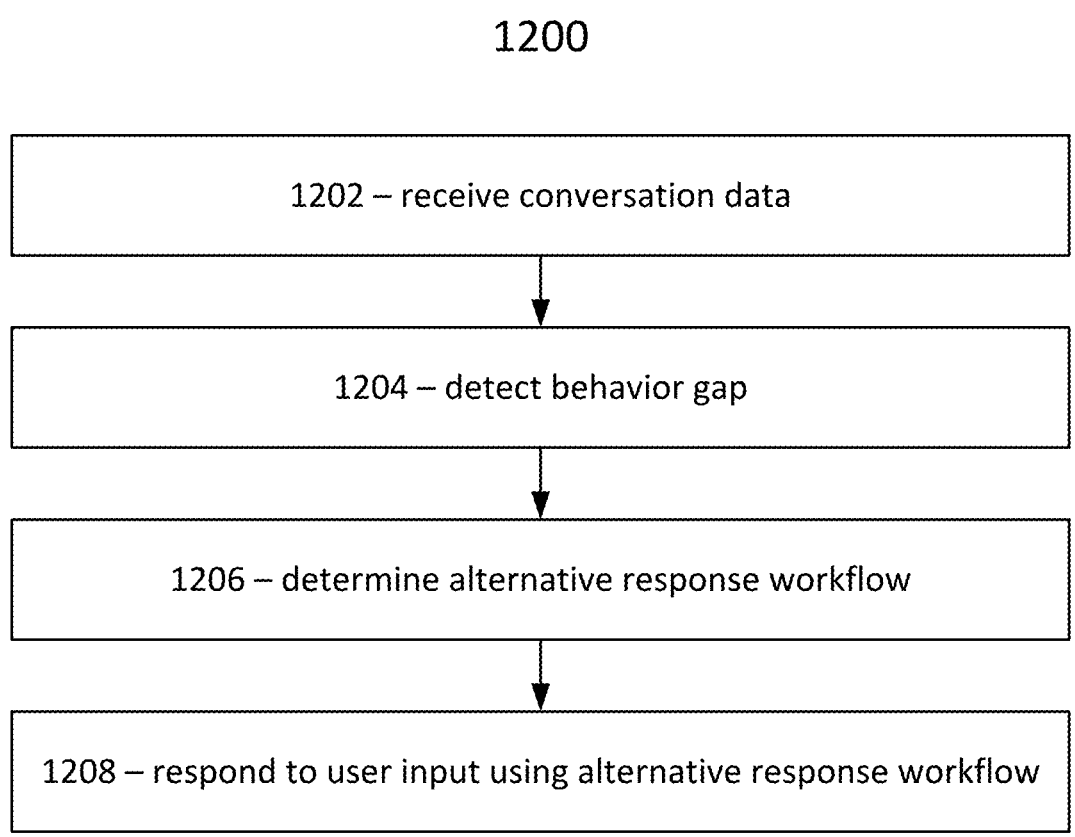
FIG. 12 shows an example workflow intervention process according to some embodiments of the disclosure.

FIG. 12 shows an example workflow intervention process 1200 according to some embodiments of the disclosure. Deployment modification module 140 may perform process 1200 to improve the quality of a response to a user input given by an LLM (e.g., LLM A 20 and/or LLM B 22) by redirecting the task of generating the response to reduce a behavior gap.

At 1202, deployment modification module 140 may receive conversation data including a user input and a response to the user input generated by one of the LLMs (for example, LLM A 20). In at least some embodiments, conversation data may also include some or all content of the MultiWOZ 202 dataset, SpokenWOZ 204 dataset, and/or PCS 206 dataset. In some embodiments, conversation data can additionally or alternatively include records from one or more ongoing or previous communication sessions involving two humans (e.g., a person with questions and a subject matter expert addressing the questions) and/or a human and a machine (e.g., an LLM such as LLM A 20 and/or LLM B 22).

At 1204, deployment modification module 140 may detect a behavior gap between the conversation data and at least one test conversation data comprising human-to-human communication samples (for example, where the text conversation data includes the MultiWOZ 202 dataset, SpokenWOZ 204 dataset, and/or PCS 206 dataset and/or ongoing/previous communication records received at 1202). Deployment modification module 140 may detect the behavior gap through any of the evaluation methods given above (e.g., process 500, 700, 900, and/or other processing described herein).

At 1206, deployment modification module 140 may determine an alternative response workflow configured to generate a second response to the user input having a second behavior gap that is less than the behavior gap. For example, deployment modification module 140 may receive second conversation data comprising the user input and the second response to the user input generated by a second LLM (e.g., LLM B 22) and process the second conversation data using the same processing as was applied to detect the behavior gap at 1204. Deployment modification module 140 may compare the behavior gap detected at 1204 with the behavior gap detected at 1206 (e.g., comparing dialog act scores or the like) and determine that the second behavior gap is less than the first behavior gap.

At 1208, deployment modification module 140 may respond to the user input using the alternative response workflow. For example, deployment modification module 140 may cause generation of the second response to the user input by the alternative response workflow and presentation of the second response in a user interface in response to the user input. That is, a second response to the user input may be generated by a second LLM, LLM B 22 in this example, and provided as a response to the user input. In another example, deployment modification module 140 may inject known human dialog acts into the response generated by LLM A 20, for example by including explicit instructions to use known human dialog acts included in the system prompt.

Example System

Figure 13:
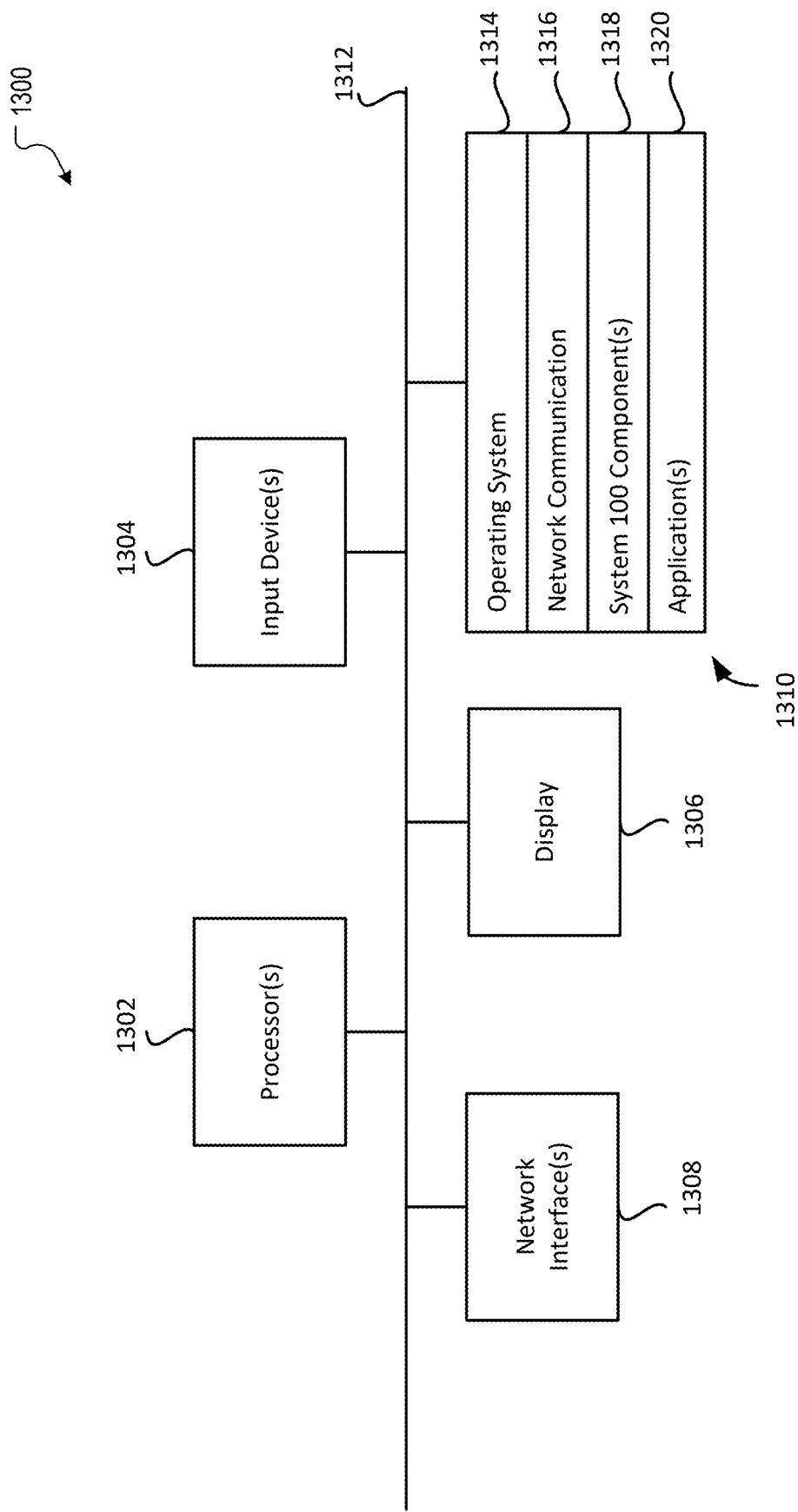
FIG. 13 shows an example computing device according to some embodiments of the disclosure.

FIG. 13 shows a computing device 1300 according to some embodiments of the disclosure. For example, computing device 1300 may function as system 100 and/or any portion(s) thereof, or multiple computing devices 1300 may function as system 100 and/or any portion(s) thereof.

Computing device 1300 may be implemented on any electronic device that runs software applications derived from compiled instructions, including without limitation personal computers, servers, smart phones, media players, electronic tablets, game consoles, email devices, etc. In some implementations, computing device 1300 may include one or more processors 1302, one or more input devices 1304, one or more display devices 1306, one or more network interfaces 1308, and one or more computer-readable mediums 1310. Each of these components may be coupled by bus 1312, and in some embodiments, these components may be distributed among multiple physical locations and coupled by a network.

Display device 1306 may be any known display technology, including but not limited to display devices using Liquid Crystal Display (LCD) or Light Emitting Diode (LED) technology. Processor(s) 1302 may use any known processor technology, including but not limited to graphics processors and multi-core processors. Input device 1304 may be any known input device technology, including but not limited to a keyboard (including a virtual keyboard), mouse, track ball, and touch-sensitive pad or display. Bus 1312 may be any known internal or external bus technology, including but not limited to ISA, EISA, PCI, PCI Express, NuBus, USB, Serial ATA or FireWire. In some embodiments, some or all devices shown as coupled by bus 1312 may not be coupled to one another by a physical bus, but by a network connection, for example. Computer-readable medium 1310 may be any medium that participates in providing instructions to processor(s) 1302 for execution, including without limitation, non-volatile storage media (e.g., optical disks, magnetic disks, flash drives, etc.), or volatile media (e.g., SDRAM, ROM, etc.).

Computer-readable medium 1310 may include various instructions 1314 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1304; sending output to display device 1306; keeping track of files and directories on computer-readable medium 1310; controlling peripheral devices (e.g., disk drives, printers, etc.) which can be controlled directly or through an I/O controller; and managing traffic on bus 1312. Network communications instructions 1316 may establish and maintain network connections (e.g., software for implementing communication protocols, such as TCP/IP, HTTP, Ethernet, telephony, etc.).

System 100 components 1318 may include instructions for performing the processing described herein. For example, system 100 components 1318 may provide instructions for implementing system 100 elements and/or performing processes 500, 700, 900, 1100, and/or 1200. Application(s) 1320 may be an application that uses or implements the outcome of processes described herein and/or other processes. In some embodiments, the various processes may also be implemented in operating system 1314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by at least one processor, conversation data comprising a user input and a response to the user input generated by a large language model (LLM);
   detecting, by the at least one processor, a behavior gap between the conversation data and at least one test conversation data comprising human-to-human communication samples;
   determining, by the at least one processor, a training intervention configured to reduce the behavior gap; and
   training, by the at least one processor, the LLM using the training intervention.

2. The method of claim 1, wherein the detecting comprises detecting at least one dialog act in the conversation data.

3. The method of claim 2, wherein the detecting the at least one dialog act comprises prompting a test LLM with a dialog act system prompt and the conversation data and receiving the at least one dialog act in a response generated by the test LLM.

4. The method of claim 1, wherein the detecting comprises detecting at least one tool use by the LLM from the conversation data.

5. The method of claim 4, wherein the detecting at least one tool use comprises prompting a test LLM with a tool use system prompt and the conversation data and receiving an indication of the at least one tool use in a response generated by the test LLM.

6. The method of claim 1, wherein the detecting comprises detecting at least one external knowledge use by the LLM from the conversation data.

7. The method of claim 6, wherein the detecting at least one external knowledge use comprises detecting copying of external knowledge into the response to the user input.

8. The method of claim 6, wherein the detecting at least one external knowledge use comprises determining a compression ratio of at least a portion of the response to the user input over referenced external knowledge.

9. The method of claim 1, wherein the training intervention is configured to reduce the behavior gap by reducing a dialog act frequency in LLM responses, reducing a tool use frequency in LLM responses, reducing external knowledge copying in LLM responses, increasing a compression ratio for external knowledge use in LLM responses, or a combination thereof.

10. The method of claim 1, wherein the training intervention comprises at least one of retraining the LLM and tuning at least one parameter of the LLM.

11. A system comprising:
   at least one processor; and
   at least one non-transitory computer-readable medium storing instructions that, when executed by the at least one processor, cause the at least one processor to perform processing comprising:
      receiving conversation data comprising a user input and a response to the user input generated by a large language model (LLM);
      detecting a behavior gap between the conversation data and at least one test conversation data comprising human-to-human communication samples;
      determining a training intervention configured to reduce the behavior gap; and
      training the LLM using the training intervention.

12. The system of claim 11, wherein the detecting comprises detecting at least one dialog act in the conversation data.

13. The system of claim 12, wherein the detecting the at least one dialog act comprises prompting a test LLM with a dialog act system prompt and the conversation data and receiving the at least one dialog act in a response generated by the test LLM.

14. The system of claim 11, wherein the detecting comprises detecting at least one tool use by the LLM from the conversation data.

15. The system of claim 14, wherein the detecting at least one tool use comprises prompting a test LLM with a tool use system prompt and the conversation data and receiving an indication of the at least one tool use in a response generated by the test LLM.

16. The system of claim 11, wherein the detecting comprises detecting at least one external knowledge use by the LLM from the conversation data.

17. The system of claim 16, wherein the detecting at least one external knowledge use comprises detecting copying of external knowledge into the response to the user input.

18. The system of claim 16, wherein the detecting at least one external knowledge use comprises determining a compression ratio of at least a portion of the response to the user input over referenced external knowledge.

19. The system of claim 11, wherein the training intervention is configured to reduce the behavior gap by reducing a dialog act frequency in LLM responses, reducing a tool use frequency in LLM responses, reducing external knowledge copying in LLM responses, increasing a compression ratio for external knowledge use in LLM responses, or a combination thereof.

20. The system of claim 11, wherein the training intervention comprises at least one of retraining the LLM and tuning at least one parameter of the LLM.

\* \* \* \* \*